United States Patent
Borlick et al.

(10) Patent No.: US 10,248,457 B2
(45) Date of Patent: *Apr. 2, 2019

(54) PROVIDING EXCLUSIVE USE OF CACHE ASSOCIATED WITH A PROCESSING ENTITY OF A PROCESSOR COMPLEX TO A SELECTED TASK

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Clint A. Hardy, Tucson, AZ (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,276

(22) Filed: Aug. 10, 2016

(65) Prior Publication Data
US 2018/0046506 A1 Feb. 15, 2018

(51) Int. Cl.
G06F 9/48 (2006.01)
(52) U.S. Cl.
CPC .................. *G06F 9/4887* (2013.01)
(58) Field of Classification Search
None
See application file for complete search history.

(56) References Cited

U.S. PATENT DOCUMENTS

| 6,085,215 A | 7/2000 | Ramakrishnan et al. |
| 6,212,544 B1 | 4/2001 | Borkenhagen et al. |

(Continued)

FOREIGN PATENT DOCUMENTS

WO 2016023448 2/2016

OTHER PUBLICATIONS

A. Tousimojarad, et al., "An Efficient Thread Mapping Strategy for Multiprogramming on Manycore Processors," Parallel Computing: Accelerating Computational Science and Engineering (CSE), Advances in Parallel Computing 25, 2013, pp. 63-71.

(Continued)

*Primary Examiner* — Van H Nguyen
(74) *Attorney, Agent, or Firm* — Rabindranath Dutta; Konrad Raynes Davda & Victor LLP

(57) ABSTRACT

A plurality of processing entities are maintained in a processor complex. In response to determining that a task is a critical task, the critical task is dispatched to a scheduler, wherein it is preferable to prioritize execution of critical tasks over non-critical tasks. In response to dispatching the critical task to the scheduler, the scheduler determines which processing entity of the plurality of processing entities has a least amount of processing remaining to be performed for currently scheduled tasks. Tasks queued on the determined processing entity are moved to other processing entities, and the currently scheduled tasks on the determined processing entity are completed. In response to moving tasks queued on the determined processing entity to other processing entities and completing the currently scheduled tasks on the determined processing entity, the critical task is dispatched on the determined processing entity.

20 Claims, 10 Drawing Sheets

(56) References Cited

U.S. PATENT DOCUMENTS

| | | | |
|---|---|---|---|
| 6,681,293 | B1 | 1/2004 | Solomon et al. |
| 6,757,897 | B1 | 6/2004 | Shi et al. |
| 8,250,347 | B2 | 8/2012 | Kra |
| 8,276,142 | B2 | 9/2012 | Alameldeen et al. |
| 8,392,661 | B1 | 3/2013 | Metcalf |
| 9,639,401 | B1 | 5/2017 | Bertram et al. |
| 2002/0184445 | A1 | 12/2002 | Cherabuddi |
| 2004/0030842 | A1 | 2/2004 | Cypher |
| 2004/0059875 | A1 | 3/2004 | Garg et al. |
| 2005/0015768 | A1 | 1/2005 | Moore |
| 2009/0216950 | A1 | 8/2009 | McCalpin et al. |
| 2010/0185882 | A1 | 7/2010 | Arnold et al. |
| 2010/0223618 | A1 | 9/2010 | Fu et al. |
| 2010/0312823 | A1 | 12/2010 | Titus |
| 2011/0072212 | A1 | 3/2011 | Kojima |
| 2012/0054760 | A1 | 3/2012 | Chung |
| 2012/0079491 | A1 | 3/2012 | Chung |
| 2012/0198461 | A1 | 8/2012 | Saxe et al. |
| 2013/0042070 | A1 | 2/2013 | Jalal et al. |
| 2013/0227127 | A1 | 8/2013 | Takano et al. |
| 2013/0304992 | A1 | 11/2013 | Lee et al. |
| 2013/0311722 | A1 | 11/2013 | Arelakis et al. |
| 2014/0059262 | A1 | 2/2014 | Davis et al. |
| 2015/0277988 | A1 | 10/2015 | Watanabe et al. |
| 2016/0203083 | A1 | 7/2016 | Park et al. |
| 2016/0283380 | A1 | 9/2016 | Vinod et al. |
| 2016/0350159 | A1 | 12/2016 | Mealey et al. |
| 2017/0083334 | A1 | 3/2017 | Burger et al. |
| 2017/0102971 | A1 | 4/2017 | Blagodurov |
| 2017/0279703 | A1 | 9/2017 | Wasmundt et al. |
| 2017/0300427 | A1 | 10/2017 | Lin et al. |
| 2018/0046507 | A1 | 2/2018 | Borlick et al. |
| 2018/0113737 | A1 | 4/2018 | Borlick et al. |
| 2018/0113744 | A1 | 4/2018 | Borlick et al. |

OTHER PUBLICATIONS

US Patent Application, dated Aug. 10, 2016, for U.S. Appl. No. 15/233,295, filed Aug. 10, 2016, invented by Matthew G. Borlick et al., Total 35 pages.

List of IBM Patents or Patent Applications Treated as Related, dated Aug. 10, 2016, pp. 2.

Office Action dated Jan. 12, 2018, pp. 23, for U.S. Appl. No. 15/233,295, filed Aug. 10, 2016.

U.S. Appl. No. 15/332,413, filed Oct. 24, 2016.

U.S. Appl. No. 15/332,660, filed Oct. 24, 2016.

List of Patents or Patent Applications Treated as Related, dated Oct. 27, 2016, pp. 2.

U.S. Appl. No. 15/233,276, filed Aug. 10, 2016.

U.S. Appl. No. 15/233,295, filed Aug. 10, 2016.

Response to Office Action 1 for U.S. Appl. No. 15/233,295, dated Apr. 12, 2018, 14 pp.

Response to Office Action 1 for U.S. Appl. No. 15/332,660, dated Apr. 18, 2018, 11 pp.

Notice of Allowance dated May 24, 2018, pp. 20, for U.S. Appl. No. 15/332,660, filed Oct. 24, 2016.

Office Action dated Jan. 19, 2018, pp. 18, for U.S. Appl. No. 15/332,660, filed Oct. 24, 2016.

Final Office Action dated Jul. 11, 2018, pp. 31, for U.S. Appl. No. 15/233,295, filed Aug. 10, 2016.

Notice of Allowance dated Sep. 13, 2018, pp. 11, for U.S. Appl. No. 15/332,660.

Yun, et al., "Memory Access Control in Multipocessor for Real-time Systems with Mixed Criticality", [online] 2012, pp. 1-10, Retrieved from the internet <https://scholar.google.com/scholar?output=instlink&q=info:OV8W3Gg33mkJ:schlar.google.com/&hll=en&as_sdt=0,47&scillfp=17545817565657558581&oi=lle>.

Augonnet, et al., "StarPU: A Unified Platform for Task Scheduling on Heterogenous Multicore Architectures" [online] Springer., May 2009, pp. 1-13, Retrieved from the internet <https://hal.inria.fr/inria-00384363/document>.

Notice of Allowance dated Oct. 11, 2018, pp. 47, for U.S. Appl. No. 15/332,413.

Response dated Oct. 11, 2018, pp. 17, to Final Office Action dated Jul. 11, 2018, pp. 31, for U.S. Appl. No. 15/233,295.

Notice of Allowance dated Dec. 19, 2018, pp. 32, for U.S. Appl. No. 15/233,295.

Notice of Allowance dated Nov. 21, 2018, pp. 16, for U.S. Appl. No. 15/332,660.

U.S. Appl. No. 16/211,996, filed Dec. 6, 2018.

List of IBM Patents or Patent Applications Treated as Related, dated Jan. 9, 2019, pp. 2.

PROVIDING EXCLUSIVE USE OF CACHE ASSOCIATED WITH A PROCESSING ENTITY OF A PROCESSOR COMPLEX TO A SELECTED TASK

BACKGROUND

1. Field

Embodiments relate to the providing of exclusive use of cache associated with a processing entity of a processor complex to a selected task.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores (also referred to as cores) and the servers may share the workload of the storage system. In a two server configuration of the storage system, either server can failover to the other if there is a failure or a planned downtime for one of the two servers. For example, a first server may failover to a second server is there is a failure of the first server.

A computational device, such as a host or a server of storage system, may include a plurality of processors and form a multiprocessing system. A computational device may have a processor complex that may have a single core or a plurality of cores, where a core may correspond to a central processing unit (CPU). For example, a dual-core processor complex has two central processing units, so that the dual-core processor complex may appear to the operating system as two CPUs.

A process (or task) is an instance of a computer program that is being executed. Depending on the operating system, a process may be made up of multiple threads of execution that execute instructions concurrently. Multiple threads may exist within the same process and share resources such as memory. A thread is what the CPU actually runs, whereas a process has the allocated memory for instructions and data. A process may need one or more threads because that is what is actually run by the CPU. Multiple threads corresponding to a process implies that the process gets more time slices on the same CPU or gets to run on more CPUs concurrently. A process needs at least one thread that the CPU executes. In a multi-core processor complex, a different process may use a different core at the same time to speed up the system.

U.S. Pat. No. 8,276,142 describes a method that includes scheduling a thread to run on a core of a multi-core processor. U.S. Pat. No. 8,250,347 describes asymmetric hardware support for a special class of threads. US Patent Publication 2005/0015768 describes a method for scheduling tasks. U.S. Pat. No. 6,212,544 describes a method for performing computer processing operations in a data processing system having a multithreaded processor and thread switch logic. U.S. Pat. No. 6,085,215 describes a method using a combination of processing threads, polling, and a use of interrupts to allocate the use of processing resources fairly among competing functions.

SUMMARY OF THE PREFERRED EMBODIMENTS

Provided are a method, a system, and a computer program product in which a plurality of processing entities are maintained in a processor complex. In response to determining that a task is a critical task, the critical task is dispatched to a scheduler, wherein it is preferable to prioritize execution of critical tasks over non-critical tasks. In response to dispatching the critical task to the scheduler, the scheduler determines which processing entity of the plurality of processing entities has a least amount of processing remaining to be performed for currently scheduled tasks. Tasks queued on the determined processing entity are moved to other processing entities, and the currently scheduled tasks on the determined processing entity are completed. In response to moving tasks queued on the determined processing entity to other processing entities and completing the currently scheduled tasks on the determined processing entity, the critical task is dispatched on the determined processing entity. As a result, critical tasks are executed faster relative to non-critical tasks.

In certain embodiments, in response to determining that the task is a non-critical task, the task is scheduled for execution in any of the plurality of processing entities. As a result, non-critical tasks may have to share the cache of the plurality of processing entities.

In further embodiments, the plurality of processing entities comprise a plurality of cores, and wherein the determined processing entity corresponds to a determined core that has a clean L1 cache and a clean L2 cache at a time at which the critical task is scheduled for execution in the determined core. As a result, critical tasks may have exclusive use of the L1 cache and L2 cache.

In yet further embodiments, the critical task executes faster by using the clean L1 cache and the clean L2 cache of the determined core, in comparison to scheduling the critical task on any other core of the plurality of cores, wherein in the other cores the L1 cache and the L2 cache are shared among a plurality of tasks. As a result, critical tasks may execute faster than non-critical tasks.

In certain embodiments, the plurality of processing entities comprise a plurality of chips having a plurality of cores, wherein the determined processing entity corresponds to a determined chip that has a clean L1 cache, a clean L2 cache, and a clean L3 cache at a time at which the critical task is scheduled for execution in the determined chip. As a result, critical tasks may have exclusive use of the L1, L2, and L3 cache.

In further embodiments, the critical task executes faster by using the clean L1 cache, the clean L2 cache, and the clean L3 cache of the determined chip, in comparison to scheduling the critical task on any other chip of the plurality of chips, wherein in the other chips the L1 cache, the L2 cache, and the L3 cache are shared among a plurality of tasks. As a result, critical tasks may execute faster that non-critical tasks in chips having L1, L2, and L3 cache.

In certain embodiments, in response to completion of the critical task in the determined processing entity, the scheduler is returned to a mode in which the scheduler schedules non-critical tasks for execution on the determined processing entity. As a result, critical tasks are scheduled earlier than certain non-critical tasks.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A computational device, such has a server, may comprise a CPU complex (processor complex) that has many chips. A chip may have a plurality of cores that may simultaneously execute a plurality of threads. All the threads running in a core may share the same L1 and L2 cache. Additionally, the threads that run on the cores in a chip share an L3 cache (This may be somewhat different in some CPU architectures where the L3 cache is also shared within the same core instead of the chip). If data is not found in the L1 cache, then the date is retrieved from the L2 cache, and if the data is not found in the L3 cache then the data is retrieved from the L3 cache.

A server in a storage system may have certain tasks that are critical for ensuring a high performance storage system. When such critical tasks are running, they may need cache hits (to the L1, L2, and L3 cache) to be efficient. If there are other tasks running in the same core or same chip, the other tasks may share the L1, L2, and L3 cache and the critical task that needs to be efficient and have good L1, L2, and L3 cache hits may execute relatively slowly.

In certain embodiments, to speed up the execution of such critical tasks the following operations are performed:

(1) A task scheduler selects the core or chip that has least runtime left for the currently scheduled tasks;

(2) The task scheduler schedules the critical task on the selected core or chip and no other task is allowed to run on the selected core or chip while the critical task runs its timeslice; and (3) Once the critical task completes its timeslice, the task scheduler returns to a normal dispatch mode on the selected core or chip.

In certain embodiments, by scheduling a critical task on a processing entity (e.g., a core and/or a chip) that is least lightly loaded, after allowing scheduled tasks on the processing entity to complete and moving queued tasks on the processing entity to other processing entities, exclusive use of the cache is provided to the critical task to allow the critical task to execute faster in comparison to non-critical tasks. Hit ratios on the cache are improved for the critical task in comparison to hit ratios on the cache for non-critical tasks that share the cache with other non-critical tasks.

Exemplary Embodiments

Figure 1:
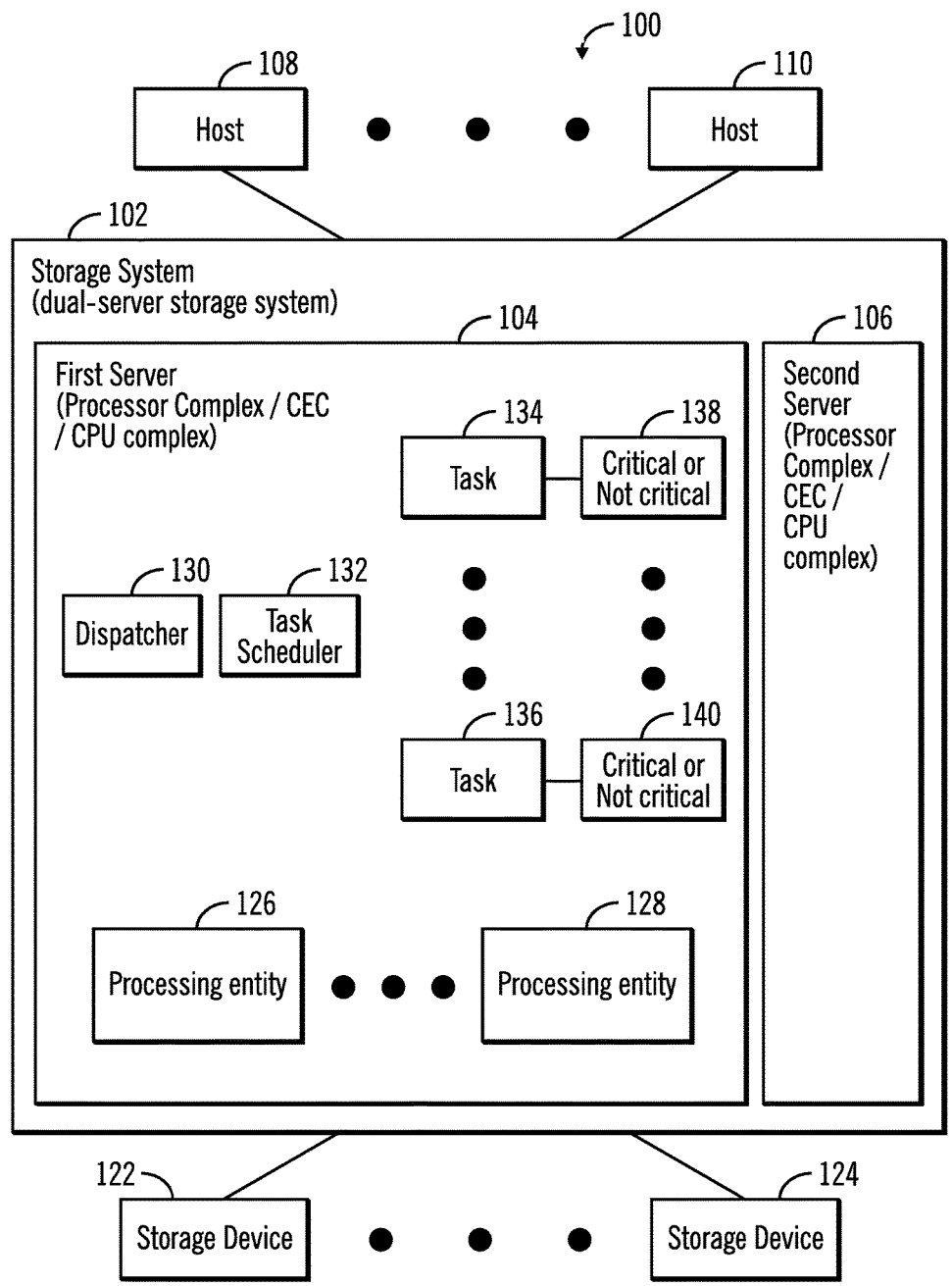
FIG. 1 illustrates a block diagram of a computing environment comprising a storage system comprising a first server and a second server that both comprise multi-core processor complexes in which a task scheduler is implemented for scheduling tasks on one or more cores, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processor complex, a central electronics complex (CEC), or a central processing unit (CPU) complex and may include one or more processors and/or processor cores. The storage system 102 may also be referred to as a dual-server storage system.

The storage system 102, the servers 104, 106 and the hosts 108, 110 may be elements in any suitable network, such as, a storage area network, a wide area network, the Internet, an intranet. In certain embodiments, storage system 102, the servers 104, 106 and the hosts 108, 110 may be elements in a cloud computing environment.

It should be noted that the storage system 102 may be configured and accessed in many different ways. For example, virtualization may be performed to access the hardware elements of the storage system 102. Additionally, in certain embodiments, the storage system 102 may have a single server or more than two servers.

In certain embodiments, each of the servers 104, 106 may have corresponding applications and data structures implemented in each, and the applications and data structures implemented in the first server 104 are shown. The server 106 may have similar applications and data structures, and may have similar hardware, firmware, and/or software.

The first server 104 includes a plurality of processing entities 126, 128, where in certain embodiments each processing entity is a central processing unit (CPU) such as a core. In certain embodiments, each processing entity 126, 128 is the lowest granularity of a processor that is configurable to execute a task.

Each server 104 may also include a dispatcher 130 and a task scheduler 132. The dispatcher 130 dispatches one or more tasks 134, 136 to the task scheduler 132 where the task scheduler 132 schedules one or more threads of a task for execution on a processing entity 126, 128. Each task 134, 136 may be a critical or a non-critical task as shown via reference numerals 138, 140. A critical task is a task that is desirable to execute ahead of a non-critical task in a fast manner. For example, in the server 104 when a device adapter indicates completion of stage and destage requests with respect to a cache, the completions may be critical tasks that may need to be processed in a fast manner over other tasks. The critical tasks may be referred to as dedicated tasks and are dispatched by the task scheduler 132 for preferential execution on cores while at the same time exclusive access to the cache is provided on the cores to the dedicated tasks.

Figure 2:
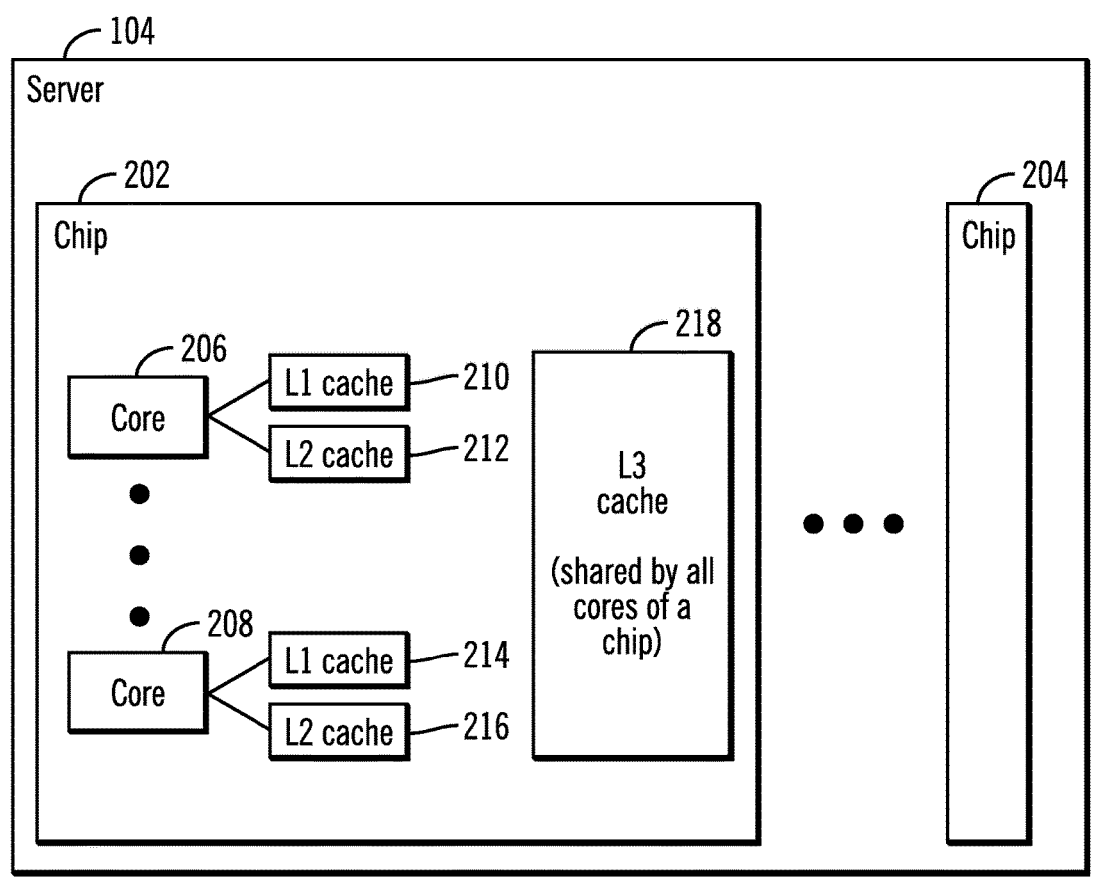
FIG. 2 illustrates a block diagram of a server that comprises a processor complex, in accordance with certain embodiments

FIG. 2 illustrates a block diagram of the server 104 that comprises a processor complex or a central electronics complex (CEC), in accordance with certain embodiments. The server 104 may be comprised of a plurality of chips 202, 204 where each chip is comprised of a plurality of cores 206, 208 as shown in FIG. 2. Each core may have a L1 cache and a L2 cache (shown via reference numerals 210, 212, 214, 216) that is shared by threads that execute in the core, and each chip 202 may have an L3 cache 218 that is shared among threads that execute in one or more cores 206, 208 of the chip 202.

In certain embodiments, each core 206, 208 corresponds to a processing entity 126, 128 shown in FIG. 1. In other embodiments, each chip 202, 204 corresponds to a processing entity 126, 128 shown in FIG. 1. Other arrangements of L1 cache, L2 cache, and L3 cache may be found in the server 104.

Figure 3:
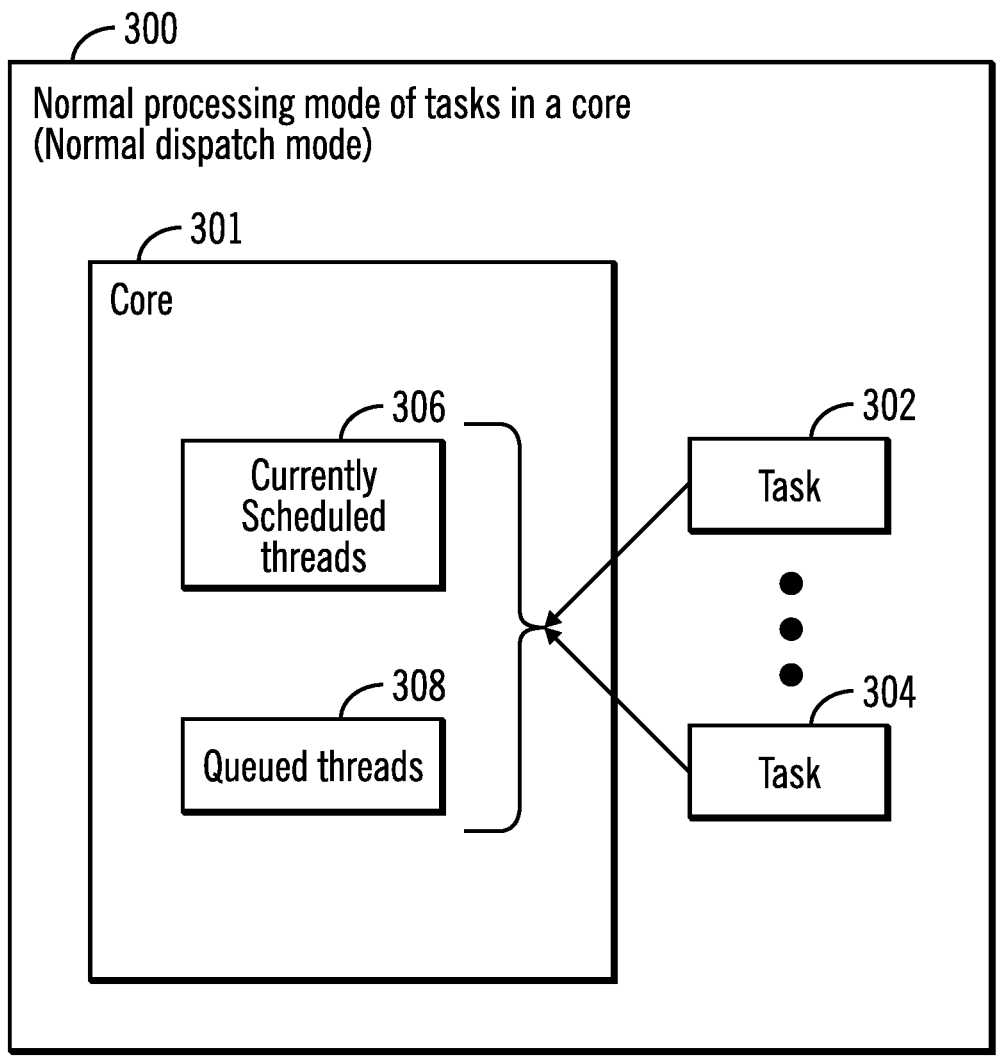
FIG. 3 illustrates a block diagram that shows normal processing mode for tasks in a core, in accordance with certain embodiments.

FIG. 3 illustrates a block diagram 300 that shows normal processing mode of tasks in a core 301, in accordance with certain embodiments. Threads corresponding to a plurality of tasks 302, 304 may be assigned for execution in the core 301. Some of these threads may be currently scheduled threads 306 and some of these threads may be queued threads 308.

Figure 4:
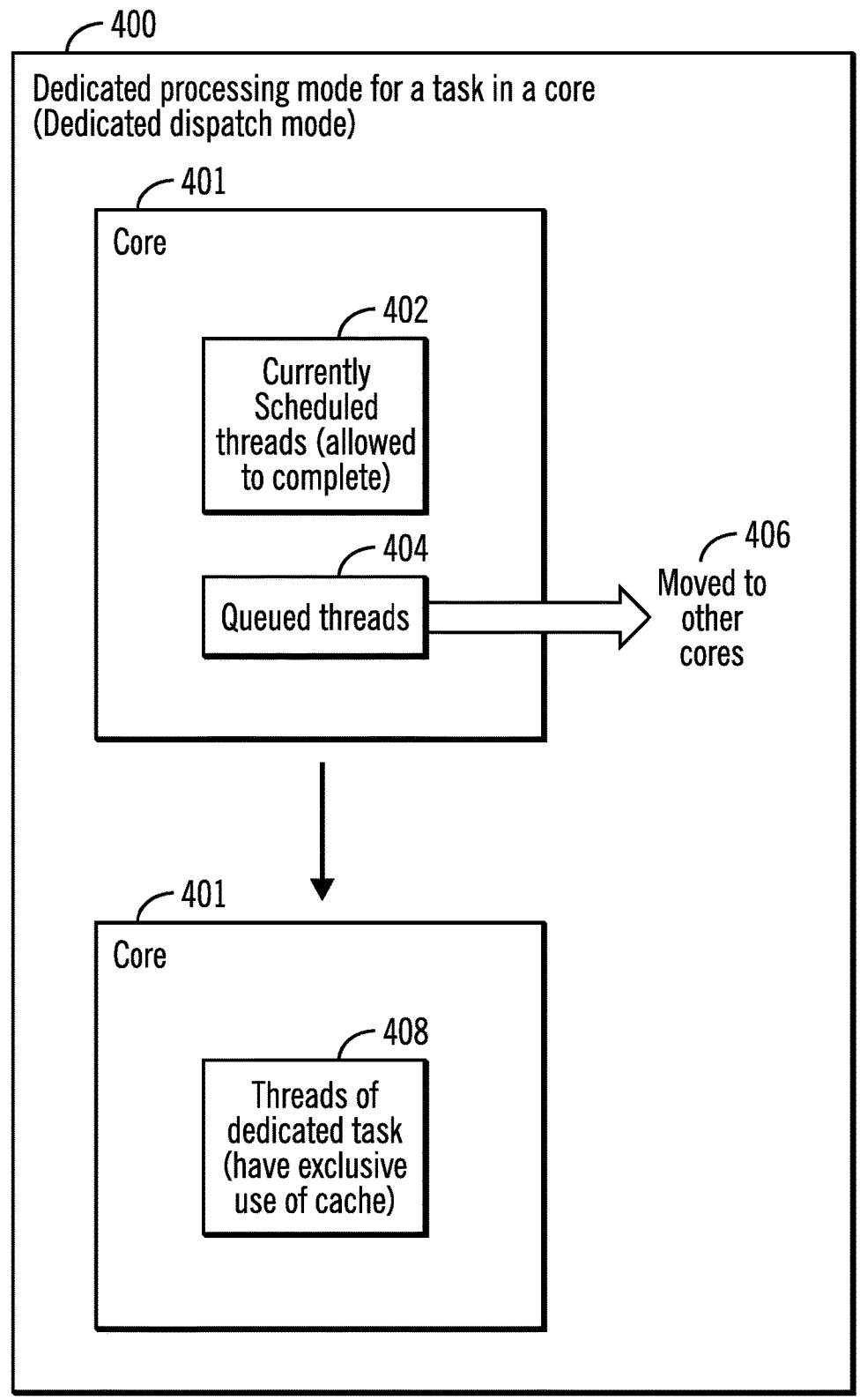
FIG. 4 illustrates a block diagram that shows a dedicated processing mode for a task in a core, in accordance with certain embodiments.

FIG. 4 illustrates a block diagram 400 that shows a dedicated processing mode for a task in a core, in accordance with certain embodiments.

In certain embodiments, before threads corresponding to a critical task (referred to as a dedicated task) are executed on a core 401, the currently scheduled threads 402 on the core 401 are allowed to complete, whereas the queued threads 404 on the core 401 are moved (shown via reference numeral 406) to another core. Subsequently, the threads corresponding to the dedicated task (i.e., the critical task) 408 execute in the core 401 and have exclusive access to the L1, L2 cache of the core 401.

Figure 5:
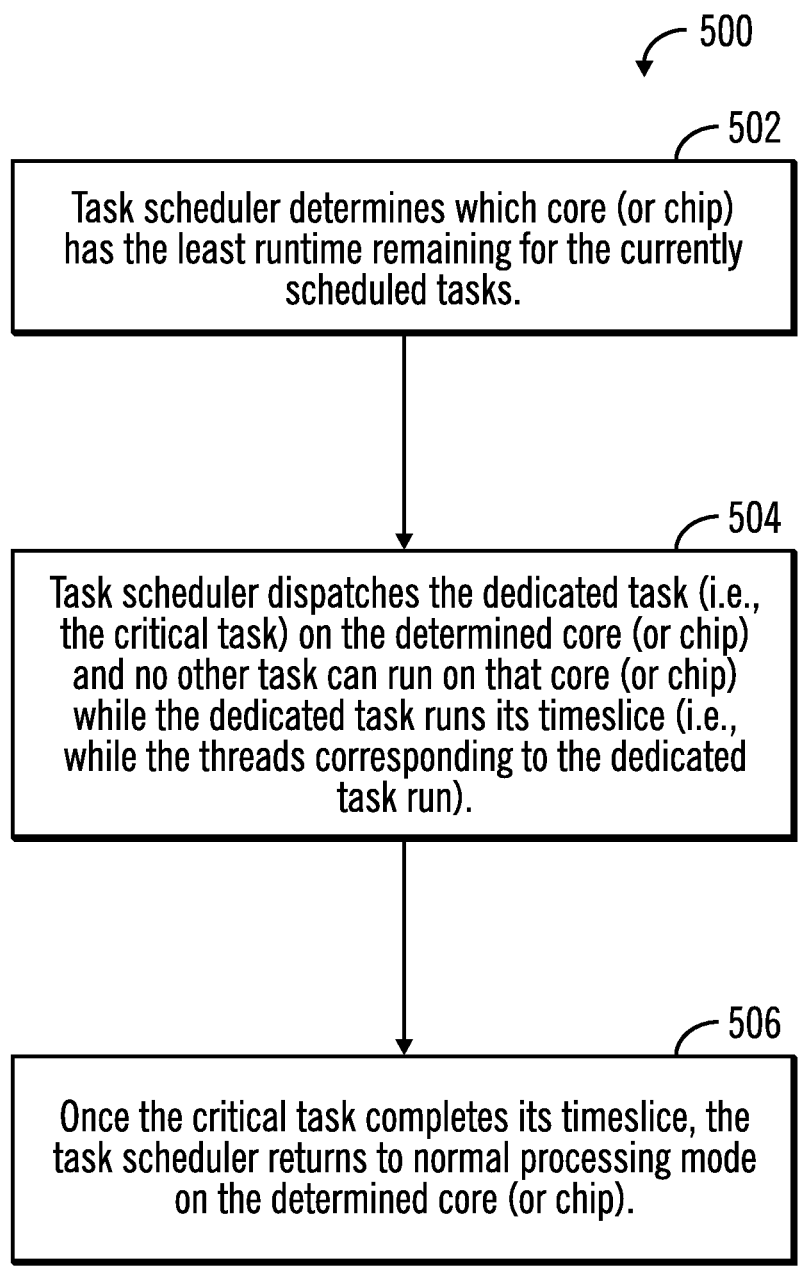
FIG. 5 illustrates a first flowchart that shows mechanisms to provide exclusive use of cache associated with a core or a chip to a selected task in a multi-core processor complex, in accordance with certain embodiments.

FIG. 5 illustrates a first flowchart 500 that shows mechanisms to provide exclusive use of cache associated with a core or a chip to a selected task in a multi-core processor complex, in accordance with certain embodiments. The operations shown in FIG. 5 may be performed by the task scheduler 132 that executes in the server 104.

Control starts at block 502 in which the task scheduler 132 determines which core (or chip) has the least runtime remaining for the currently scheduled tasks. The task scheduler 132 schedules (at block 504) a dedicated task (i.e., a critical task) on the determined core (or chip) and no other task can run on that core (or chip) while the dedicated task runs its timeslice (i.e., while the threads corresponding to the dedicated task run).

From block 504 control proceeds to block 506 in which once the critical task completes its timeslice, the task scheduler 132 returns to normal processing mode on the determined core (or chip).

Figure 6:
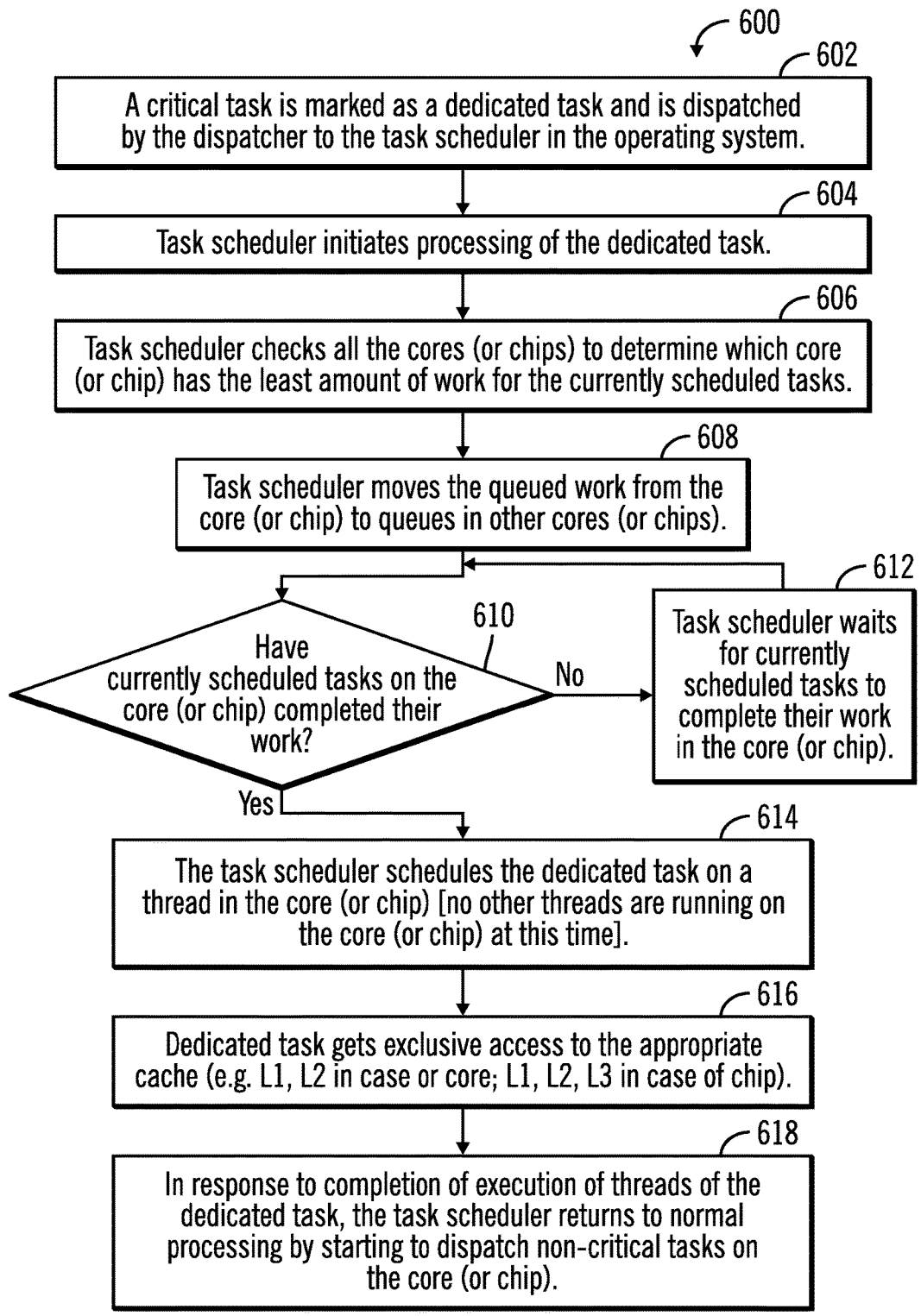
FIG. 6 illustrates a second flowchart that shows mechanisms to provide exclusive use of cache associated with a core or a chip to a selected task in a multi-core processor complex, in accordance with certain embodiments.

FIG. 6 illustrates a second flowchart 600 that shows mechanisms to provide exclusive use of cache associated with a core or a chip to a selected task in a multi-core processor complex, in accordance with certain embodiments. The operations shown in FIG. 6 may be performed in the server 104, 106 or the storage system 102.

Control starts at block 602 in which a critical task is marked as a dedicated task and is dispatched by the dispatcher 130 to the task scheduler 132 in the operating system that executes in the server 104. The task scheduler 132 initiates (at block 604) a processing of the dedicated task.

Control proceeds to block 606 in which the task scheduler checks all the cores (or chips) to determine which core (or chip) has the least amount of work for the currently scheduled tasks and moves (at block 608) the queued work from the core (or chip) to queues in other cores (or chips).

Control proceeds to block 610 in which a determination is made as to whether all currently scheduled tasks on the core (or chip) have completed their work. If not, then the task scheduler 132 waits (at block 612) for currently scheduled tasks to complete their work in the core (or chip).

If at block 610 a determination is made that all currently scheduled tasks on the core (or chip) have completed their work, then control proceeds to block 614 in which the task scheduler 132 schedules the dedicated task on a thread in the core (or chip). It may be noted that no other threads are running on the core (or chip) at this time and as a result the dedicated task gets exclusive access (at block 616) to the appropriate cache (e.g., L1, L2 cache of the core, or L1, L2, L3 cache in case of the chip).

From block 616 control proceeds to block 618 in which in response to completion of execution of threads of the dedicated task, the task scheduler 132 returns to a normal mode of processing by starting to dispatch non-critical tasks on the core (or chip)

Figure 7:
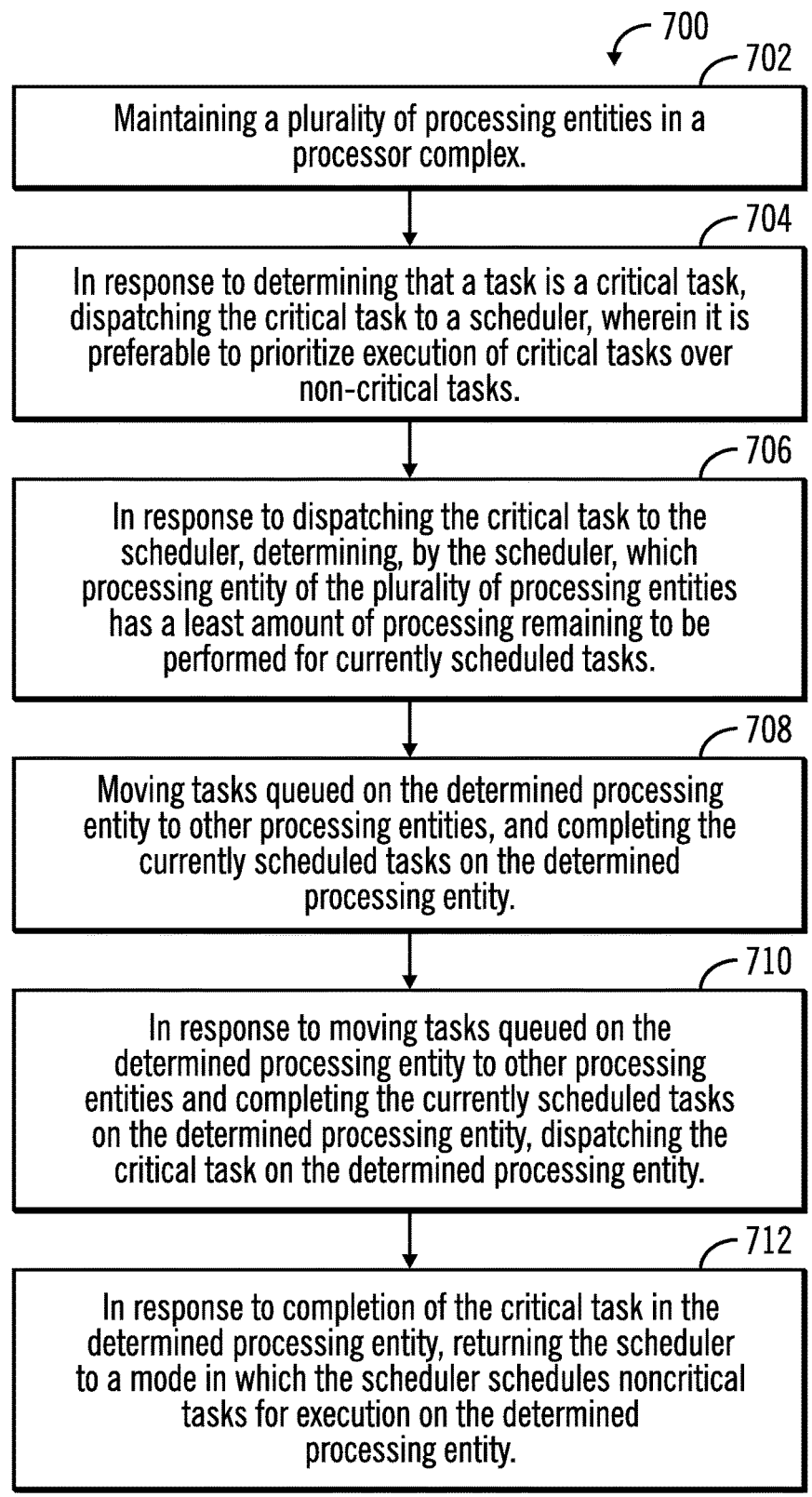
FIG. 7 illustrates a third flowchart that shows mechanisms to provide exclusive use of cache associated with a core or a chip to a selected task in a multi-core processor complex, in accordance with certain embodiments.

FIG. 7 illustrates a third flowchart 700 that shows mechanisms to provide exclusive use of cache associated with a core or a chip to a selected task in a multi-core processor complex, in accordance with certain embodiments. The operations shown in FIG. 7 may be performed in the server 104, 106 or the storage system 102.

Control starts at block 702 in which a plurality of processing entities 126, 128 (e.g., cores and/or chips) are maintained in a processor complex 104. In response to determining that a task is a critical task, the critical task is dispatched (at block 704) to a scheduler 132, wherein it is preferable to prioritize execution of critical tasks over non-critical tasks.

Control proceeds to block 706, in which in response to dispatching the critical task to the scheduler 132, the scheduler 132 determines which processing entity of the plurality of processing entities 126, 128 has a least amount of processing remaining to be performed for currently scheduled tasks. Tasks queued on the determined processing entity are moved (at block 708) to other processing entities, and the currently scheduled tasks on the determined processing entity are completed.

Control proceeds to block 710, in which in response to moving tasks queued on the determined processing entity to other processing entities and completing the currently scheduled tasks on the determined processing entity, the critical task is dispatched on the determined processing entity. Subsequently, at block 712 in response to completion of the critical task in the determined processing entity, the scheduler 132 is returned to a mode in which the scheduler 132 schedules non-critical tasks for execution on the determined processing entity.

In certain embodiments, in response to determining that the task is a non-critical task, the task is scheduled for execution in any of the plurality of processing entities 126, 128.

In certain embodiments, the plurality of processing entities 126, 128 comprise a plurality of cores 206, 208, and the determined processing entity corresponds to a determined core 206 that has a clean L1 cache 210 and a clean L2 cache 212 at a time at which the critical task is scheduled for execution in the determined core 206. The critical task executes faster by using the clean L1 cache 210 and the clean L2 cache 212 of the determined core 206, in comparison to scheduling the critical task on any other core 208 of the plurality of cores, wherein in the other cores 208 the L1 cache 214 and the L2 cache 216 are shared among a plurality of tasks.

In certain embodiments, the plurality of processing entities 126, 128 comprise a plurality of chips 202, 204 having a plurality of cores, wherein the determined processing entity corresponds to a determined chip 202 that has a clean L1 cache 210, 214, a clean L2 cache 214, 216, and a clean L3 cache 218 at a time at which the critical task is scheduled for execution in the determined chip. The critical task executes faster by using the clean L1 cache 210, 212, the clean L2 cache 214, 216, and the clean L3 cache 218 of the determined chip 202, in comparison to scheduling the critical task on any other chip 204 of the plurality of chips 202, 204, wherein in the other chips the L1 cache, the L2 cache, and the L3 cache are shared among a plurality of tasks.

Therefore, FIGS. 1-7 illustrate certain embodiments in which by scheduling a critical task on a processing entity that is least lightly loaded, after allowing scheduled tasks on the processing entity to complete and moving queued tasks on the processing entity to other processing entities, exclusive use of the cache is provided to the critical task to allow the critical task to execute faster in comparison to non-critical tasks.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
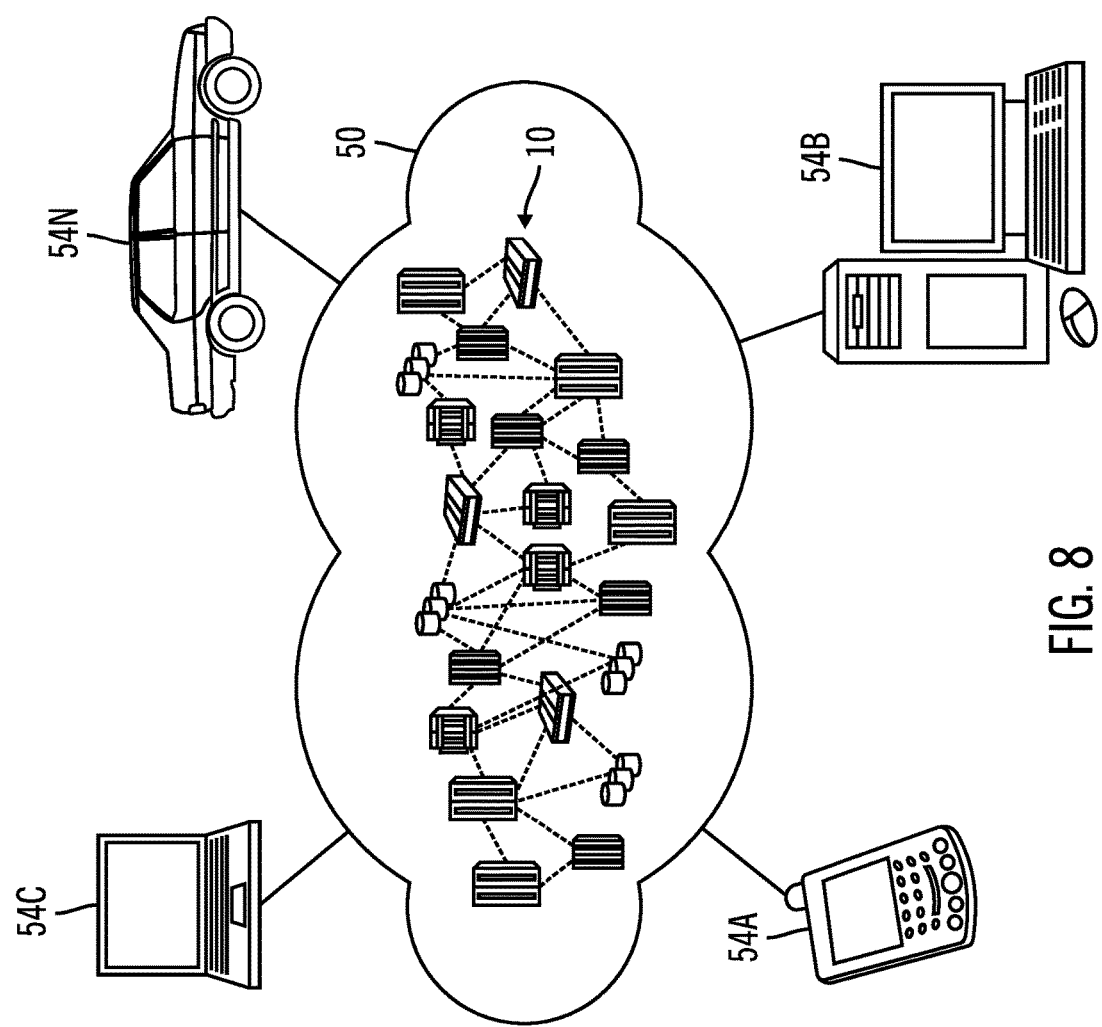
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
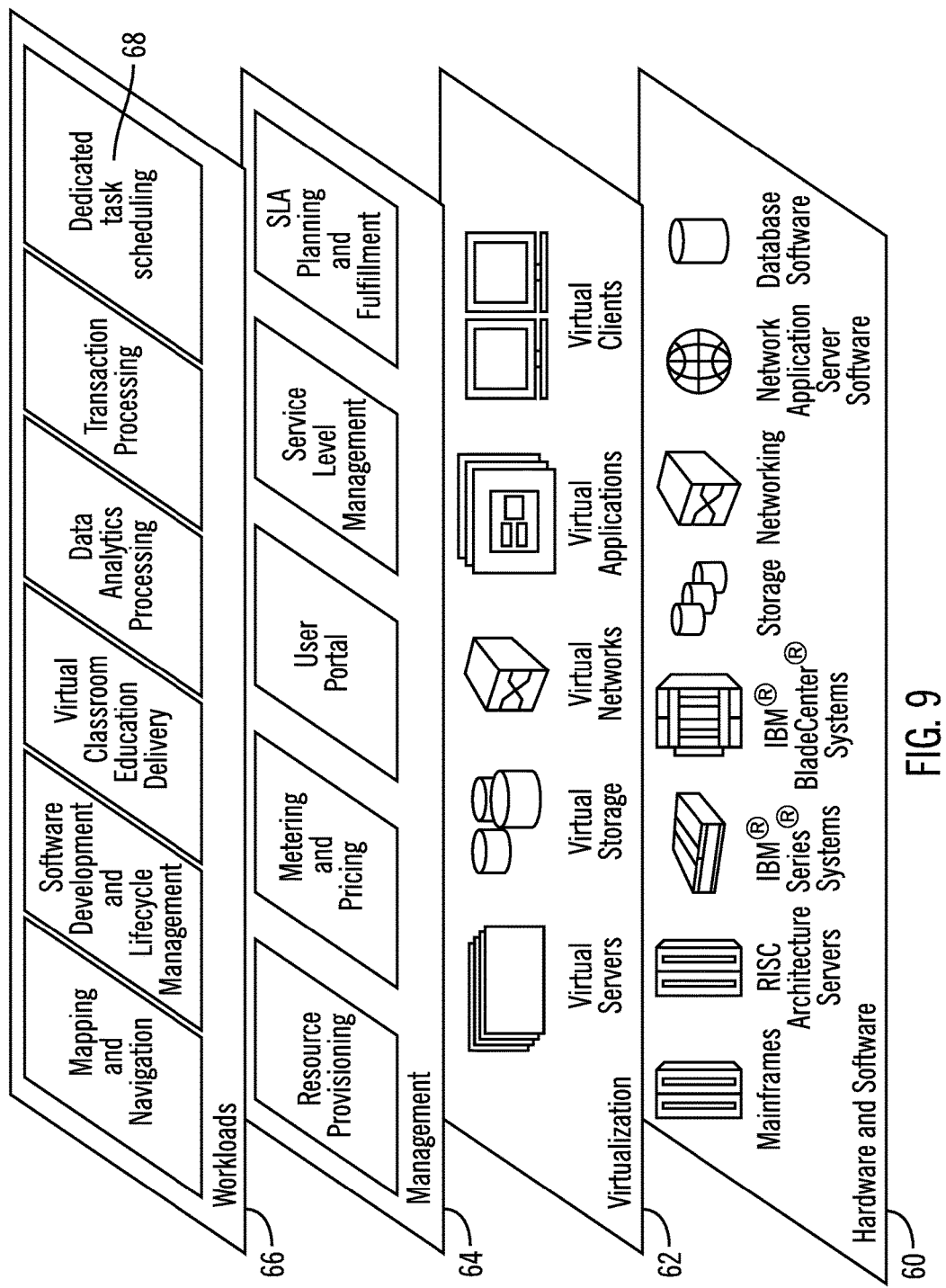
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the dedicated task scheduling 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
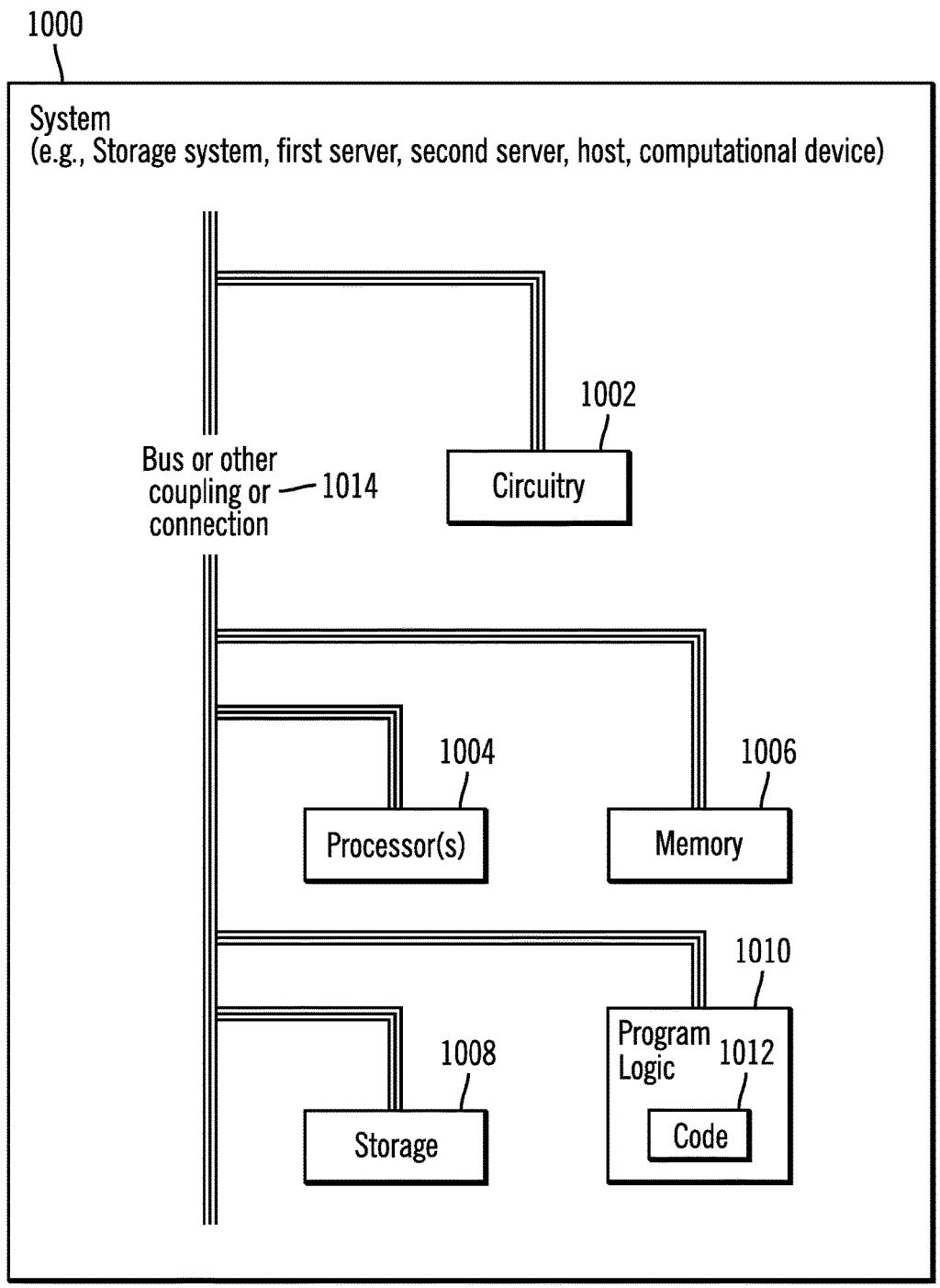
FIG. 10 illustrates a block diagram of a computational system that shows certain elements that may be included in the storage system, servers, and/or the host(s), as described in FIG. 1 and FIG. 2 in accordance with certain embodiments.

FIG. 10 illustrates a block diagram that shows certain elements that may be included in the storage system 102, the first server 104, the second server 106, the hosts 108, 110 or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining a plurality of processing entities in a processor complex;
in response to determining that a task is a critical task, dispatching the critical task to a scheduler, wherein it is preferable to prioritize execution of critical tasks over non-critical tasks;
in response to dispatching the critical task to the scheduler, determining, by the scheduler, which processing entity of the plurality of processing entities has a least amount of processing remaining to be performed for currently scheduled tasks;
moving tasks queued on the determined processing entity to other processing entities, and completing the currently scheduled tasks on the determined processing entity;
in response to moving tasks queued on the determined processing entity to other processing entities and completing the currently scheduled tasks on the determined processing entity, dispatching the critical task on the determined processing entity, wherein the plurality of processing entities comprise a plurality of cores, and wherein the determined processing entity corresponds to a determined core that has a clean L1 cache and a clean L2 cache at a time at which the critical task is scheduled for execution in the determined core and no other tasks besides the critical task are running on the determined core at the time; and in response to the critical task being scheduled on the determined core, the critical task secures exclusive access to the L1 cache and L2 cache of the determined core, wherein if data is not found in the L1 cache of the determined core then the data is retrieved from the L2 cache of the determined core, and wherein each core of the plurality of cores have different sets of L1 cache and L2 cache but share a L3 cache.

2. The method of claim 1, the method further comprising:
in response to determining that the task is a non-critical task, scheduling the task for execution in any of the plurality of processing entities.

3. The method of claim 1, wherein the critical task executes faster by using the clean L1 cache and the clean L2 cache of the determined core, in comparison to scheduling the critical task on any other core of the plurality of cores, wherein in the other cores the L1 cache and the L2 cache are shared among a plurality of tasks.

4. The method of claim 1, the method further comprising:
in response to completion of the critical task in the determined processing entity, returning the scheduler to a mode in which the scheduler schedules non-critical tasks for execution on the determined processing entity.

5. A system, comprising:
a memory; and
a processor coupled to the memory, wherein the processor performs operations, the operations comprising:
maintaining a plurality of processing entities in a processor complex;
in response to determining that a task is a critical task, dispatching the critical task to a scheduler, wherein it is preferable to prioritize execution of critical tasks over non-critical tasks;
in response to dispatching the critical task to the scheduler, determining, by the scheduler, which processing entity of the plurality of processing entities has a least amount of processing remaining to be performed for currently scheduled tasks;
moving tasks queued on the determined processing entity to other processing entities, and completing the currently scheduled tasks on the determined processing entity;
in response to moving tasks queued on the determined processing entity to other processing entities and completing the currently scheduled tasks on the determined processing entity, dispatching the critical task on the determined processing entity, wherein the plurality of processing entities comprise a plurality of cores, and wherein the determined processing entity corresponds to a determined core that has a clean L1 cache and a clean L2 cache at a time at which the critical task is scheduled for execution in the determined core and no other tasks besides the critical task are running on the determined core at the time; and
in response to the critical task being scheduled on the determined core, the critical task secures exclusive access to the L1 cache and L2 cache of the determined core, wherein if data is not found in the L1 cache of the determined core then the data is retrieved from the L2 cache of the determined core, and wherein each core of the plurality of cores have different sets of L1 cache and L2 cache but share a L3 cache.

6. The system of claim 5, the operations further comprising:
in response to determining that the task is a non-critical task, scheduling the task for execution in any of the plurality of processing entities.

7. The system of claim 5, wherein the critical task executes faster by using the clean L1 cache and the clean L2 cache of the determined core, in comparison to scheduling the critical task on any other core of the plurality of cores, wherein in the other cores the L1 cache and the L2 cache are shared among a plurality of tasks.

8. The system of claim 5, the operations further comprising:
in response to completion of the critical task in the determined processing entity, returning the scheduler to a mode in which the scheduler schedules non-critical tasks for execution on the determined processing entity.

9. A computer program product, the computer program product comprising a computer readable storage medium having computer readable program code embodied therewith, the computer readable program code configured to perform operations, the operations comprising:
maintaining a plurality of processing entities in a processor complex;
in response to determining that a task is a critical task, dispatching the critical task to a scheduler, wherein it is preferable to prioritize execution of critical tasks over non-critical tasks;
in response to dispatching the critical task to the scheduler, determining, by the scheduler, which processing entity of the plurality of processing entities has a least amount of processing remaining to be performed for currently scheduled tasks;
moving tasks queued on the determined processing entity to other processing entities, and completing the currently scheduled tasks on the determined processing entity;
in response to moving tasks queued on the determined processing entity to other processing entities and completing the currently scheduled tasks on the determined processing entity, dispatching the critical task on the determined processing entity, wherein the plurality of processing entities comprise a plurality of cores, and wherein the determined processing entity corresponds to a determined core that has a clean L1 cache and a clean L2 cache at a time at which the critical task is scheduled for execution in the determined core and no other tasks besides the critical task are running on the determined core at the time; and
in response to the critical task being scheduled on the determined core, the critical task secures exclusive access to the L1 cache and L2 cache of the determined core, wherein if data is not found in the L1 cache of the determined core then the data is retrieved from the L2 cache of the determined core, and wherein each core of the plurality of cores have different sets of L1 cache and L2 cache but share a L3 cache.

10. The computer program product of claim 9, the operations further comprising:
in response to determining that the task is a non-critical task, scheduling the task for execution in any of the plurality of processing entities.

11. The computer program product of claim 9, wherein the critical task executes faster by using the clean L1 cache and the clean L2 cache of the determined core, in comparison to scheduling the critical task on any other core of the plurality of cores, wherein in the other cores the L1 cache and the L2 cache are shared among a plurality of tasks.

12. The computer program product of claim 9, the operations further comprising:
   in response to completion of the critical task in the determined processing entity, returning the scheduler to a mode in which the scheduler schedules non-critical tasks for execution on the determined processing entity.

13. A storage system, comprising:
   a first server; and
   a second server coupled to the first server, wherein the storage system is configurable to perform operations, the operations comprising:
      maintaining a plurality of processing entities;
      in response to determining that a task is a critical task, dispatching the critical task to a scheduler, wherein it is preferable to prioritize execution of critical tasks over non-critical tasks;
      in response to dispatching the critical task to the scheduler, determining, by the scheduler, which processing entity of the plurality of processing entities has a least amount of processing remaining to be performed for currently scheduled tasks;
      moving tasks queued on the determined processing entity to other processing entities, and completing the currently scheduled tasks on the determined processing entity;
      in response to moving tasks queued on the determined processing entity to other processing entities and completing the currently scheduled tasks on the determined processing entity, dispatching the critical task on the determined processing entity, wherein the plurality of processing entities comprise a plurality of cores, and wherein the determined processing entity corresponds to a determined core that has a clean L1 cache and a clean L2 cache at a time at which the critical task is scheduled for execution in the determined core and no other tasks besides the critical task are running on the determined core at the time; and
      in response to the critical task being scheduled on the determined core, the critical task secures exclusive access to the L1 cache and L2 cache of the determined core, wherein if data is not found in the L1 cache of the determined core then the data is retrieved from the L2 cache of the determined core, and wherein each core of the plurality of cores have different sets of L1 cache and L2 cache but share a L3 cache.

14. The storage system of claim 13, the operations further comprising:
   in response to completion of the critical task in the determined processing entity, returning the scheduler to a mode in which the scheduler schedules non-critical tasks for execution on the determined processing entity.

15. The storage system of claim 13, the operations further comprising:
   in response to determining that the task is a non-critical task, scheduling the task for execution in any of the plurality of processing entities.

16. The storage system of claim 13, wherein the critical task executes faster by using the clean L1 cache and the clean L2 cache of the determined core, in comparison to scheduling the critical task on any other core of the plurality of cores, wherein in the other cores the L1 cache and the L2 cache are shared among a plurality of tasks.

17. A server computational device of a dual-server storage system, the server computational device comprising:
   memory; and
   a processor coupled to the memory, wherein the processor performs operations, the operations comprising:
      maintaining a plurality of processing entities;
      in response to determining that a task is a critical task, dispatching the critical task to a scheduler, wherein it is preferable to prioritize execution of critical tasks over non-critical tasks;
      in response to dispatching the critical task to the scheduler, determining, by the scheduler, which processing entity of the plurality of processing entities has a least amount of processing remaining to be performed for currently scheduled tasks;
      moving tasks queued on the determined processing entity to other processing entities, and completing the currently scheduled tasks on the determined processing entity;
      in response to moving tasks queued on the determined processing entity to other processing entities and completing the currently scheduled tasks on the determined processing entity, dispatching the critical task on the determined processing entity, wherein the plurality of processing entities comprise a plurality of cores, and wherein the determined processing entity corresponds to a determined core that has a clean L1 cache and a clean L2 cache at a time at which the critical task is scheduled for execution in the determined core and no other tasks besides the critical task are running on the determined core at the time; and
      in response to the critical task being scheduled on the determined core, the critical task secures exclusive access to the L1 cache and L2 cache of the determined core, wherein if data is not found in the L1 cache of the determined core then the data is retrieved from the L2 cache of the determined core, and wherein each core of the plurality of cores have different sets of L1 cache and L2 cache but share a L3 cache.

18. The server computational device of claim 17, the operations further comprising:
   in response to completion of the critical task in the determined processing entity, returning the scheduler to a mode in which the scheduler schedules non-critical tasks for execution on the determined processing entity.

19. The server computational device of claim 17, the operations further comprising:
   in response to determining that the task is a non-critical task, scheduling the task for execution in any of the plurality of processing entities.

20. The server computational device of claim 17, wherein the critical task executes faster by using the clean L1 cache and the clean L2 cache of the determined core, in comparison to scheduling the critical task on any other core of the plurality of cores, wherein in the other cores the L1 cache and the L2 cache are shared among a plurality of tasks.

* * * * *